US007315783B2

(12) United States Patent
Lou

(10) Patent No.: US 7,315,783 B2
(45) Date of Patent: Jan. 1, 2008

(54) TRAVELTIME CALCULATION IN THREE DIMENSIONAL TRANSVERSELY ISOTROPIC (3D TI) MEDIA BY THE FAST MARCHING METHOD

(75) Inventor: Min Lou, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/537,078

(22) Filed: Sep. 29, 2006

(65) Prior Publication Data

US 2007/0168167 A1    Jul. 19, 2007

Related U.S. Application Data

(63) Continuation-in-part of application No. 11/366,137, filed on Mar. 2, 2006, now abandoned.

(60) Provisional application No. 60/756,739, filed on Jan. 6, 2006.

(51) Int. Cl.
*G01V 1/28* (2006.01)
(52) U.S. Cl. .................. 702/18; 702/11; 702/14; 367/38; 367/52; 367/57
(58) Field of Classification Search ............ 702/18; 367/52
See application file for complete search history.

(56) References Cited

U.S. PATENT DOCUMENTS 6,085,195 A    7/2000  Hoyt et al.
6,324,478 B1   11/2001 Popovici et al.
6,785,612 B1    8/2004 Zhang
6,944,094 B1    9/2005 Thomsen et al.
6,967,898 B2 * 11/2005 Leaney .................. 367/52

OTHER PUBLICATIONS

Thomsen, Leon. "Weak elastic anisotropy". Geophysics. vol. 51. No. 10 (Oct. 1986) p. 1954-1966.
Popovici, et al. "3-D imaging using higher order fast marching traveltimes". Geophysics. vol. 67, No. 2 (Mar.-Apr. 2002); p. 604-609.
Jiao, et al. "3-D TTI eikonal traveltime Kirchhoff migration". SEG. Houston 2005 Annual Meeting, pp. 108-111.
Zhang, et al. "An Eikonal Solver in Tilted TI media." SEG Int'l Exposition and 72nd Annual Meeting. Salt Lake City, Utah. Oct. 6-11, 2002. 4 pages.
Alkhalifah, Tariq. "Traveltime computation with the linerarized eikonal equation for anisotropic media" Geophysical Prospecting, 2002, 50, 373-382.

* cited by examiner

*Primary Examiner*—John Barlow
*Assistant Examiner*—Sujoy Kundu
(74) *Attorney, Agent, or Firm*—Cantor Colburn LLP

(57) ABSTRACT

A technique for calculating traveltime of a seismic wave in three dimensional tilted transversely isotropic (3D TI) media includes determining a wave vector, defining a unit vector, calculating an angle of the wave vector from an axis and performing a slowness determination, wherein a unit vector for a symmetry axis is defined as: (cos $\phi$ sin $\theta$, sin $\phi$ sin $\theta$, cos $\theta$); where $\phi$ represents the azimuth of the symmetry axis measured from the x direction; and, $\theta$ represents the dip angle of the symmetry axis measured from the z direction. The technique may be practiced as a computer implemented set of instructions, and may be incorporated into measurement equipment.

9 Claims, 6 Drawing Sheets

TRAVELTIME CALCULATION IN THREE DIMENSIONAL TRANSVERSELY ISOTROPIC (3D TI) MEDIA BY THE FAST MARCHING METHOD

CROSS REFERENCE TO RELATED APPLICATIONS

This patent application is filed under 37 CFR §1.53(b) as a Continuation-in-Part and claims priority under 35 U.S.C. 120 to U.S. patent application Ser. No. 11/366,137, entitled "Traveltime Calculation in 3D TTI Media by the Fast Marching Method" filed Mar. 2, 2006 now abandoned, which in turn claims priority from U.S. Provisional Patent Application No. 60/756,739, filed on Jan. 6, 2006, the entire contents of which are incorporated by reference.

BACKGROUND OF THE INVENTION

1. Field of the Invention

The invention herein relates to techniques for resolving imaging data collected during geophysical exploration.

2. Description of the Related Art

A number of problems arise during geophysical exploration. For example, resolving seismic wave propagation data in isotropic and anisotropic formations (media) has required elaborate modeling. One model is that of the Kirchhoff migration model.

The traveltime calculation is the backbone of any Kirchhoff pre-stack depth migration. During the past decade, there have been numerous methods developed based upon the eikonal equation solver to calculate traveltimes in three dimensional (3D) isotropic media. Those methods are generally classified as either ray tracing or finite difference (FD) approaches.

Among them, one approach is the fast marching algorithm with first or higher order FD eikonal equation solver. This method has proven popular due to its computation efficiency, stability, and satisfactory accuracy (Popovici and Sethian 2002). It has been well recognized however, that most sedimentary rocks display transverse isotropy (TI) with a vertical symmetry axis (VTI) or a general tilted symmetric axis (TTI) to seismic waves. The phenomena can significantly affect focusing and imaging positions in seismic data migration. Recently, Alkhalifah (2002) presented a FD algorithm to solve first arrival traveltimes in 3D VTI media by a perturbation method. Jiao (2005) used a similar FD algorithm based on perturbation theory to calculate first arrival traveltimes in 3D TTI media. In addition, Zhang et. al. (2002) presented a FD scheme in the celerity domain to calculate first arrival traveltimes in 2D TTI media.

What are lacking are improvements to efficiency, accuracy and stability in order to reduce the costs associated with geological exploration.

SUMMARY OF THE INVENTION

Examples of certain features of the invention have been summarized here rather broadly in order that the detailed description thereof that follows may be better understood and in order that the contributions they represent to the art may be appreciated. There are, of course, additional features of the invention that will be described hereinafter and which will form the subject of the claims appended hereto.

Disclosed is a method for determining a slowness of a wave in three dimensional transversely isotropic (3D TI) media, the method including: determining a vector for the wave; calculating an angle between the wave vector and an axis of symmetry of the media; and, using the calculated angle to determine the slowness of the wave, wherein a unit vector for a symmetry axis is defined as: $(\cos\phi\sin\theta, \sin\phi\sin\theta, \cos\theta)$; where $\phi$ represents the azimuth of the symmetry axis measured from the x direction; and, $\theta$ represents the dip angle of the symmetry axis measured from the z direction.

Also disclosed is a computer program product including computer readable instructions for determining slowness of a wave in three dimensional transversely isotropic (3D TI) media, by: determining a vector for the wave; calculating an angle between the wave vector and an axis of symmetry of the media; and, using the calculated angle to determine a slowness of the wave, wherein a unit vector for a symmetry axis is defined as: $(\cos\phi\sin\theta, \sin\phi\sin\theta, \cos\theta)$; where $\phi$ represents the azimuth of the symmetry axis measured from the x direction; and, $\theta$ represents the dip angle of the symmetry axis measured from the z direction.

Further disclosed is a tool adapted for use within a wellbore, the tool including: a transducer and a processor in communication with the transducer; and a computer program product for execution by the processor, the product including computer readable instructions for determining a slowness of a wave in media including features having at least one of a traverse isotropy (TI) and a tilted symmetric axis isotropy (TTI), by: at least one of identifying and generating the wave; determining a vector for the wave, wherein determining the vector includes using a recursive loop from a previous slowness determination; wherein a unit vector for a symmetry axis is defined as: $(\cos\phi\sin\theta, \sin\phi\sin\theta, \cos\theta)$; where $\phi$ represents the azimuth of the symmetry axis measured from the x direction; and, $\theta$ represents the dip angle of the symmetry axis measured from the z direction; calculating an angle $\alpha$ between the wave vector and an axis of symmetry of the media, wherein calculating the angle $\alpha$ includes solving the relationship: $\cos^{-1}[(\tau_x \cos\phi \sin\theta + \tau_y \sin\phi \sin\theta + \tau_z \cos\theta)/(\tau_x^2 + \tau_y^2 + \tau_z^2)^{1/2}]$; where $\phi$ represents the azimuth of the symmetry axis measured from the x direction; $\theta$ represents the dip angle of the symmetry axis measured from the z direction; $\tau_x$ represents a traveltime derivative component for an x-axis; $\tau_y$ represents the traveltime derivative component for an y-axis; and, $\tau_z$ represents the traveltime derivative component for an z-axis; and, using the calculated angle to determine a slowness of the wave; wherein determining the slowness $S_{ijk}$ includes solving the relationships: $S_{ijk}(P) = 1/[v_{p0}(1+\epsilon\sin^2\alpha + D(\epsilon, \delta, \alpha, v_{p0}, v_{s0}))]^{1/2}$; $S_{ijk}(SV) = 1/\{v_{s0}[1+(v_{s0}/v_{p0})^2\epsilon\sin^2\alpha - (v_{s0}/v_{p0})^2 D(\epsilon, \delta, \alpha, v_{p0}, v_{s0})]^{1/2}\}$; and, $S_{ijk}(SH) = 1/[v_{s0}(1+2\gamma\sin^2\alpha)^{1/2}]$; where $v_{p0}$, $v_{s0}$ represent vertical velocities for P and SV waves, respectively; $\alpha$ represents an angle between the wave vector and an axis of symmetry of the media; and, $\epsilon$, $\delta$, $\gamma$ and D includes relationships of components of stress and strain for the media.

BRIEF DESCRIPTION OF THE FIGURES

For detailed understanding of the present invention, references should be made to the following detailed description of the embodiment, taken in conjunction with the accompanying drawings, in which like elements have been given like numerals, wherein.

DETAILED DESCRIPTION OF THE INVENTION

Disclosed herein is a method for calculation of first arrival traveltimes in three-dimensional transversely isotropic (3D TI) media that is based on the fast marching method. The method disclosed is comparatively more accurate than other prior art techniques. Further, the method provides advantages in that certain beneficial aspects of the fast marching method are not perturbed. For example, the method preserves computational efficiency and substantial stability for any 3D TI velocity model applied to isotropic media, wherein the model includes large velocity gradients and arbitrary orientation of symmetry axis. In addition, the method disclosed can be advantageously applied to a Kirchhoff pre-stack depth migration for 3D TI media and to estimate TI parameters for Vertical Seismic Profiling (VSP) data.

Figure 1:
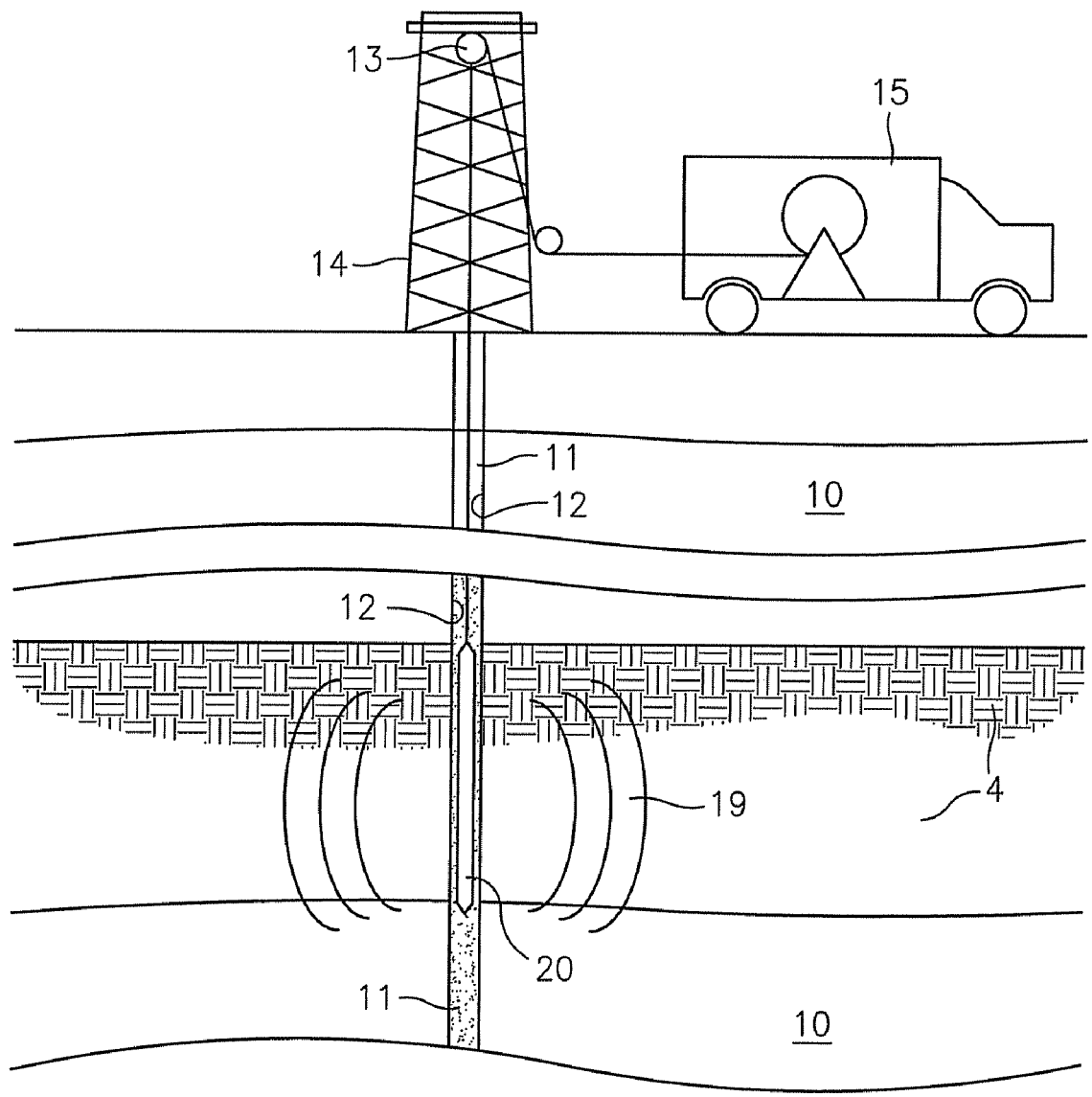
FIG. 1 depicts a sampling tool within a wellbore.

As depicted in FIG. 1, in typical embodiments, a tool 20 is disposed within a wellbore 11. The tool 20 is suspended by a wireline 12, typically from a derrick 14 using a pulley system 13 and a service vehicle 15. The tool 20 transmits and receives a series of wavefronts 19 using equipment for sampling within the wellbore 11. Relying upon wavefront data (such as knowledge of the character of the each transmitted wavefront 19 and received wavefront 19), the character of the surrounding earth 10 and formations 4 therein may be determined. Resolving the wavefront data may be completed in accordance with the teachings herein.

One non-limiting example of the tool 10 is the XMAC tool, which is an acoustic instrument produced by Baker Hughes of Houston, Tex. As discussed herein, reference to the tool 20 and aspects thereof generally refer to the exemplary and non-limiting embodiment, the XMAC tool 20. The XMAC tool 20 is generally adapted for conducting wireline measurements. Another exemplary tool 20 is the APX tool produced by Baker Hughes of Houston, Tex. The APX tool is generally adapted for performing logging-while-drilling (LWD). The tool 20, as discussed herein, is generally regarded as a measuring tool 20.

The tool 20 includes components as necessary for at least one of generation and reception of an acoustic signal. In one embodiment, the tool 20 includes at least one transducer for generating the acoustic signal. However, acoustic signal may be generated by transmitters and received by receivers as well. In short, the tool 20 provides for at least one of generation and receipt of acoustic signals, depicted as the wavefront 19.

The acoustic signal that is at least one of generated and interpreted by the exemplary tool 20 includes P-waves and S-waves. A P-wave, also referred to as a "primary wave" is a seismic wave. P-waves include seismic waves having a highest velocity of all seismic waves and are thus the first to arrive at a location. This means that the particles in the body of the Earth have vibrations along or parallel to the direction of travel of the wave energy. The S-wave, or "secondary wave", moves as a shear or transverse wave, so motion is perpendicular to the direction of wave propagation.

Figure 2:
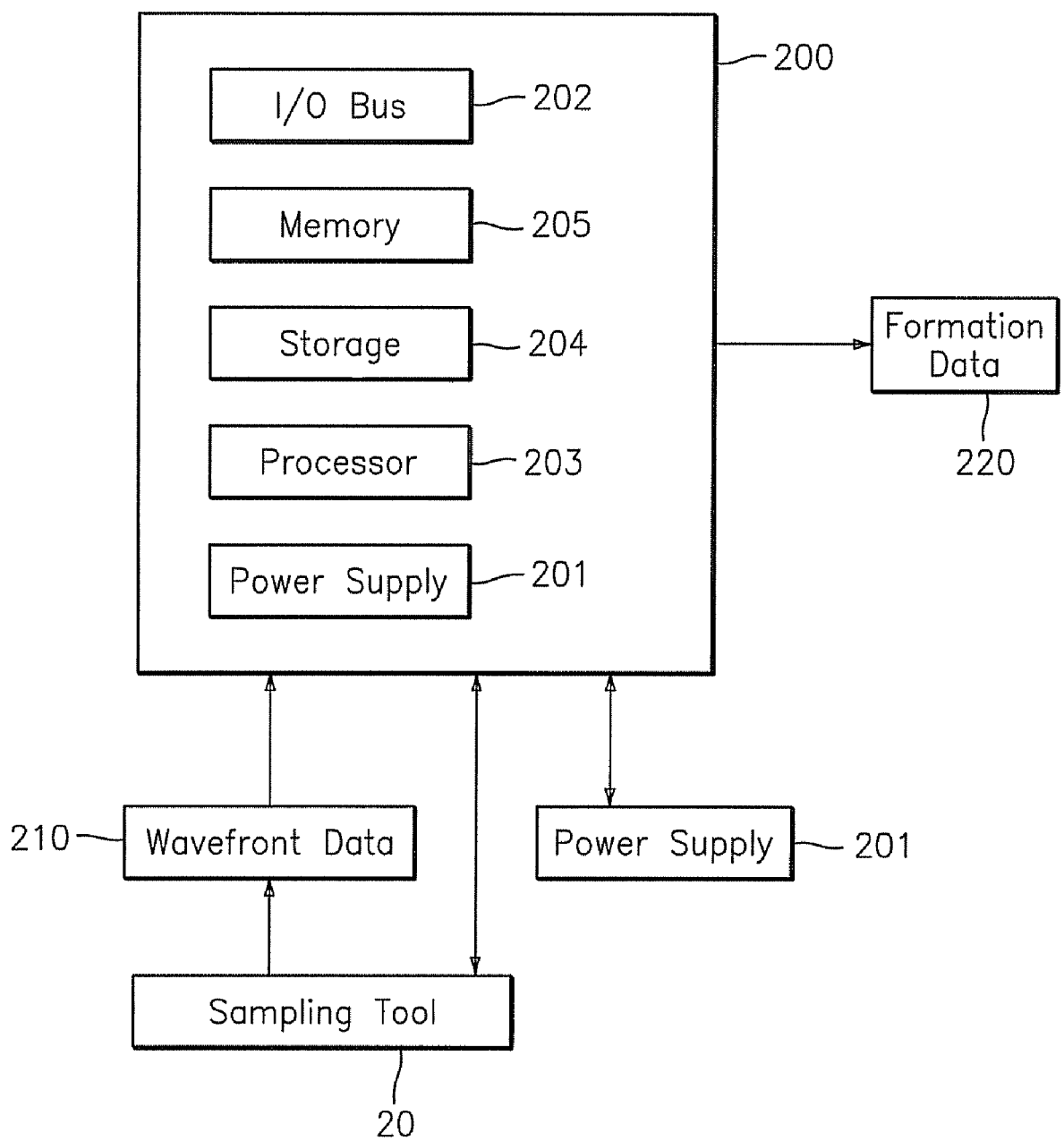
FIG. 2 depicts aspects of an electronics unit.

Referring to FIG. 2, and in regard to the tool 20, the tool 20 is typically coupled to an electronics unit 200. The electronics unit 200 typically includes, without limitation, at least one power supply 201, an input/output bus 202, a processor 203, storage 204, memory 205 and other components (not shown) such as an input device and an output device. Other components may be included as deemed suitable.

In typical embodiments, the electronics unit 200 receives the wavefront data 210 from the tool 20 and processes the wavefront data 210 to produce formation data 220.

In order to place the teachings into context, a review of the prior art is now presented.

Referring to the teachings of Thomsen (see "Weak Elastic Anisotropy" by Thomsen, L., Geophysics., Vol. 51, No. 10, October 1986 pp. 1954-1966), a linearly elastic material is defined as one in which each component of stress $\sigma_{ij}$ is linearly dependent upon every component of strain $\epsilon_{kl}$. Since each directional index may assume values of 1, 2, 3 (representing directions x, y, z), there are nine relations, each one involving one component of stress and nine components of strain. These nine equations are conventionally expressed in Equation 1:

$$\sigma_{ij} = \sum_{k=1}^{3} \sum_{l=1}^{3} C_{ijkl} \epsilon_{kl}, i, j = 1, 2, 3 \qquad (1)$$

where the 3×3×3×3 elastic modulus tensor $C_{ijkl}$ characterizes the elasticity of the medium.

Figure 3:
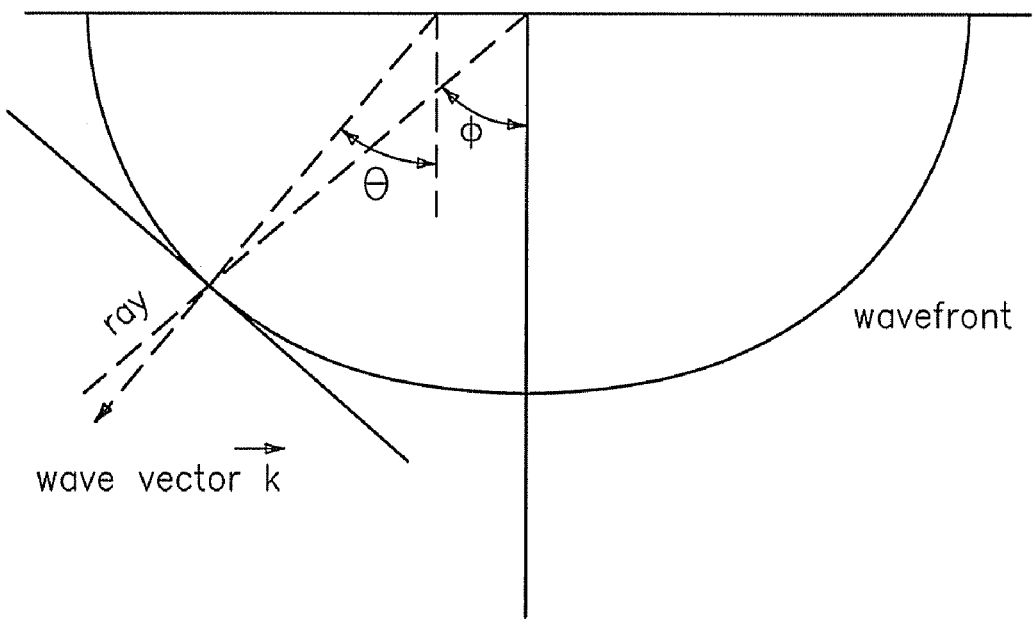
FIG. 3 depicts a relationship between a phase angle for a wavefront and a group angle for a ray.

Referring to FIG. 3, a phase angle (θ) for the wavefront 19 is depicted in relation to the group angle (φ) for a ray. It is important to clarify the distinction between the phase angle (θ) and the ray angle (φ) (along which the energy propagates). Referring to FIG. 1, the wavefront 19 is locally perpendicular to the propagation vector $\vec{k}$, since $\vec{k}$ points to the direction the maximum rate of increase in phase. The phase velocity v(θ) is also called the wavefront velocity, since it measures the velocity of the wavefront 19 along $\vec{k}$ (θ). Since the wavefront 19 is non-spherical, it is clear that (θ) (also called the wave front normal angle) is different from (φ), the ray angle from the source point to the wavefront 19.

The velocities of three possible seismic wavefronts (P, SV, and SH) may therefore be given respectively as:

$$v_P(\theta) = \left\{\frac{1}{2\rho}[C_{33} + C_{44} + (C_{11} - C_{33})\sin^2\theta + D(\theta)]\right\}^{1/2} \quad (2a)$$

$$v_{SV}(\theta) = \left\{\frac{1}{2\rho}[C_{33} + C_{44} + (C_{11} - C_{33})\sin^2\theta - D(\theta)]\right\}^{1/2} \quad (2b)$$

$$v_{SH}(\theta) = \left[\frac{1}{\rho}(C_{66}\sin^2\theta + C_{44}\cos^2\theta)\right]^{1/2} \quad (2c)$$

where $$D(\theta) = \{(C_{33}-C_{44})^2 + 2[2(C_{13}+C_{44})^2 - (C_{33}-C_{44})(C_{11} + C_{33}-2C_{44})]\sin^2\theta + [(C_{11}+C_{33}-2C_{44})^2 - 4(C_{13}+C_{44})^2]\sin^4\theta\}^{1/2} \quad (2d)$$

As noted by Thomsen, some suitable combinations of components of the stress and strain are suggested to describe aspects of the anisotropy within the formation. These combinations (known also as Thomsen's parameters) are:

$$\varepsilon \equiv \frac{(C_{11} - C_{33})}{2C_{33}}; \quad (3)$$

$$\gamma \equiv \frac{(C_{66} - C_{44})}{2C_{44}}; \text{ and,} \quad (4)$$

$$\delta \equiv \frac{(C_{13} + C_{44})^2 - (C_{33} - C_{44})^2}{2C_{33}(C_{33} - C_{44})}; \quad (5)$$

Accordingly, a general eikonal equation for describing a local grid isotropic or transverse isotropic (TI) medium can be written as:

$$[\tau_x^2(x,y,z) + \tau_y^2(x,y,z) + \tau_z^2(x,y,z)]^{1/2} = s(x,y,z) \quad (6)$$

where $\tau(x,y,z)$ is a traveltime derivative component for each axis of the model and $s(x,y,z)$ is the phase slowness for a 3D velocity model. In isotropic media, $s(x,y,z)$ is a function of coordinates $(x,y,z)$ only, while in 3D TI media, $s(x,y,z)$ is a function of the coordinates $(x,y,z)$, $\epsilon$, $\gamma$, and $\delta$, and the wave vector $\vec{k}$ relative to the TI symmetry axis.

The teachings of Popovici and Sethian are also referred to for establishing a context for the teachings herein. Refer to "3D Imaging Using Higher Order Fast Marching Traveltimes" by Popovici, M., et al, Geophyics., Vol. 67, No. 2, March-April 2002 pp. 604-609. incorporated herein by reference in its entirety.

For the techniques disclosed herein, each space derivative $\tau_x$, $\tau_y$, and $\tau_z$ can be calculated by a fast marching FD scheme:

$$[\max(D_{ijk}^{-x}\tau, -D_{ijk}^{+x}\tau, 0)^2 + \max(D_{ijk}^{-y}\tau, -D_{ijk}^{+y}\tau, 0)^2 + \max(D_{ijk}^{-z}\tau, -D_{ijk}^{+z}\tau, 0)^2]^{1/2} = S_{ijk} \quad (7)$$

where $D^-$ and $D^+$ are forward and backward FD operators and $S_{ijk}$ is the slowness at grid point $(i,j,k)$. An important part in this algorithm is the determination of $S_{ijk}$ for each grid location in the 3D TTI media. An exemplary embodiment of aspects of an algorithm 400 for the traveltime determination is provided in FIG. 4.

Figure 4:
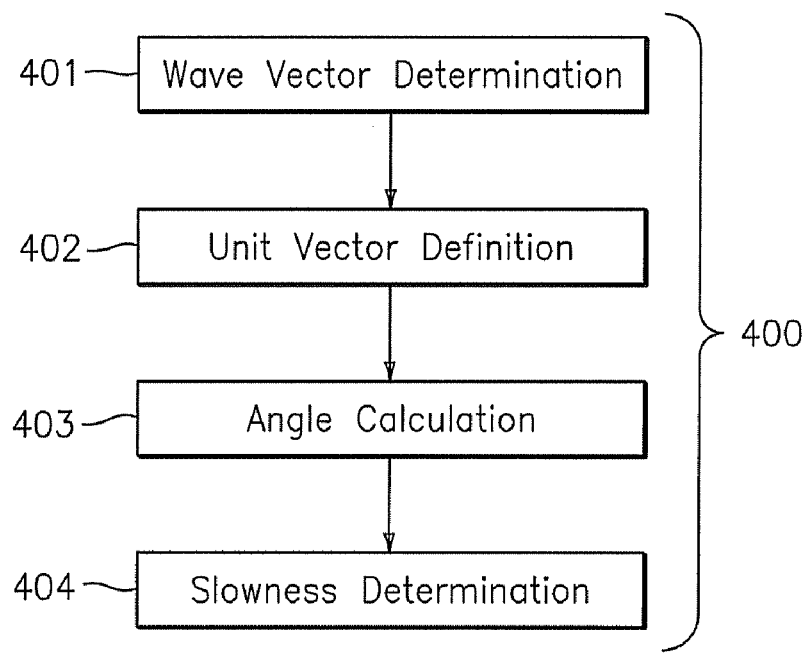
FIG. 4 is a flow chart depicting exemplary aspects of a method for calculating traveltime.

Referring to FIG. 4, in a first stage, wave vector determination 401 is completed. Typically, determination of the wave vector (normal to wavefront), denoted as $(\tau_x, \tau_y, \tau_z)$, is determined using a recursive loop from each previous traveltime calculation for each grid location. It should be noted that wave vector determination 401 inherently calls for wave identification or detection. In one embodiment, identification occurs by generation of the wave. Thus, initial aspects of the wave may be known.

Next, unit vector definition 402 is completed. Typically, the unit vector of the symmetry axis of the TTI media is defined as (cos φ sin θ, sin φ sin θ, cos θ), where φ is the azimuth of the symmetry axis measured from the x direction and θ is the dip angle of the symmetry axis measured from the z direction.

In a third stage of angle calculation 403, the angle α between the wave vector $\vec{k}$ and the symmetry axis in each local TTI medium grid is typically calculated as:

$$\alpha = \cos^{-1}[(\tau_x \cos\phi \sin\theta + \tau_y \sin\phi \sin\theta + \tau_z \cos\theta)/(\tau_x^2 + \tau_y^2 + \tau_z^2)^{1/2}] \quad (8).$$

In a fourth stage of the procedure 400, slowness determination 404 is performed. Typically, the slowness $S_{ijk}$ (P) of the P wave in each local TTI medium grid is determined as:

$$S_{ijk}(P) = 1/\{v_{p0}[1 + \epsilon \sin^2\alpha + D(\epsilon, \delta, \alpha, v_{p0}, v_{s0})]^{1/2}\} \quad (9a)$$

where $\epsilon$ and $\delta$ correlate to Equations (3) and (5) above, $v_{p0}$ and $v_{s0}$ are vertical velocities for P and SV waves in each local TTI medium grid and $D(\epsilon, \delta, \alpha, v_{p0}, v_{s0})$ is defined as:

$$D(\varepsilon, \delta, \alpha, v_{P0}, v_{S0}) \equiv \frac{1}{2}\left(1 - \frac{v_{S0}^2}{v_{P0}^2}\right)\left\{\left[1 + \frac{4(2\delta - \varepsilon)}{(1 - v_{S0}^2/v_{P0}^2)^3}\sin^2\alpha\cos^2\alpha + \frac{4(1 - v_{S0}^2/v_{P0}^2 + \varepsilon)}{(1 - v_{S0}^2/v_{P0}^2)^2}\sin^4\alpha\right]^{1/2}\right\} \quad (9b)$$

Similarly, the slowness $S_{ijk}$ (SV) of the SV wave and the slowest $S_{ijk}$ (SH) of the SH wave in each local TTI medium is, respectively, determined as:

$$S_{ijk}(SV) = 1/\{v_{s0}[1 + (v_{s0}/v_{p0})^2 \epsilon \sin^2\alpha - (v_{s0}/v_{p0})^2 D(\epsilon, \delta, \alpha, v_{p0}, v_{s0})]^{1/2}\} \quad (9c); \text{ and,}$$

$$S_{ijk}(SH) = 1/[v_{s0}(1 + 2\gamma \sin^2\alpha)^{1/2}] \quad (9d).$$

It should be noted that Equations 9a to 9d provide accurate determinations of the slowness $S_{ijk}$ for each of three waves (P, SV, SH) for substantially all strong 3D TTI media.

One skilled in the art will note that in broad terms, slowness S is the inverse of (or inversely proportional to) the velocity v. Accordingly, it should be recognized that the slowness S and the velocity v may be effectively interchanged in support of calculational techniques.

Figure 5:
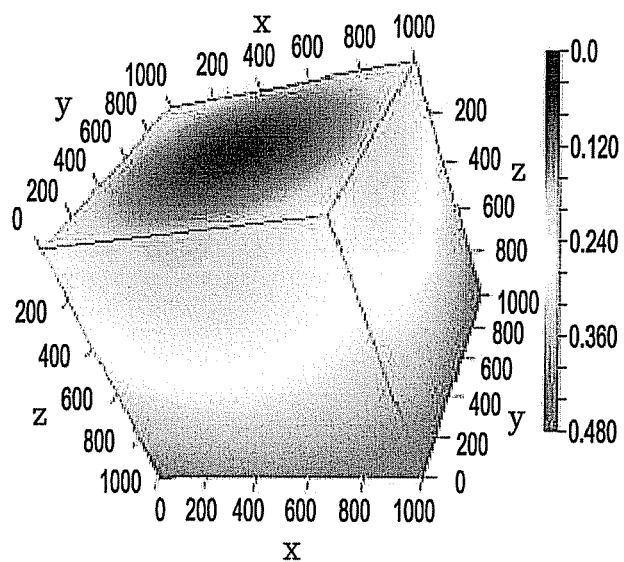
FIG. 5 depicts aspects of a 3D traveltime cube.

The algorithm 400 was first tested using a constant TTI medium with parameters $v_{p0}$=2500 m/s, $v_{s0}$=1250 m/s, $\epsilon$=0.15, and $\delta$=0.10. The tilted angle of the symmetry axis was θ=30° and φ=0°. FIG. 5 shows the traveltime cube of the P wave on 201×201×201 grid points (grid interval 5m), through a center point source (500 m, 500 m, 10 m). The 3D traveltime cube (201×201×201) depicted in FIG. 5 was generated by a point source at (500 m, 500 m, 10 m) in a constant TTI medium with a tilted symmetry axis (30° to z and 0° to x) ($v_{p0}$=2500 m/s, $v_{s0}$=1250 m/s, $\epsilon$=0.15, $\delta$=0.1).

Figure 6A:
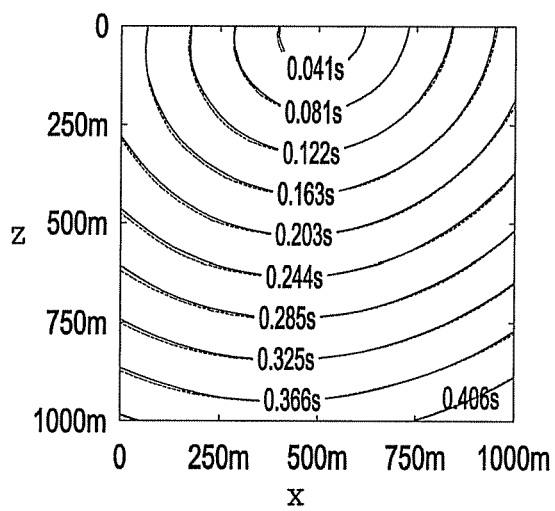
FIG. 6A and FIG. 6B, collectively referred to as FIG. 6, depict vertical slices (z-x and z-y, respectively) of the traveltime cube in FIG. 5 through a source position.
Figure 6B:
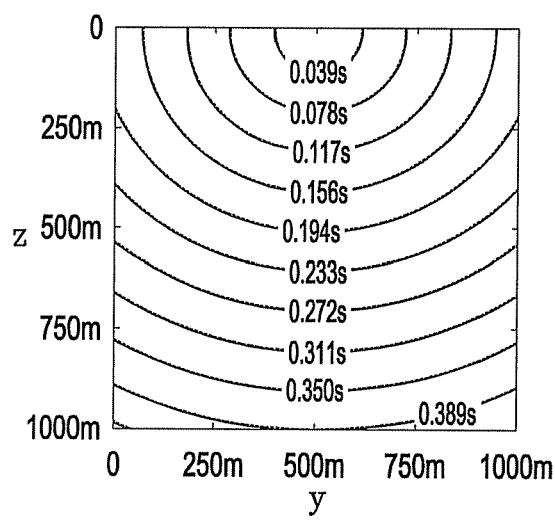

FIG. 6 shows two vertical slices (z-x and z-y) of the traveltime cube of FIG. 5 through the source point. In FIG. 6, the solid lines depict the results computed by the algorithm with the $2^{nd}$ order FD fast marching scheme, while the dashed lines depict the analytical computation results. The solid and dashed lines almost exactly match each other.

Figure 7A:
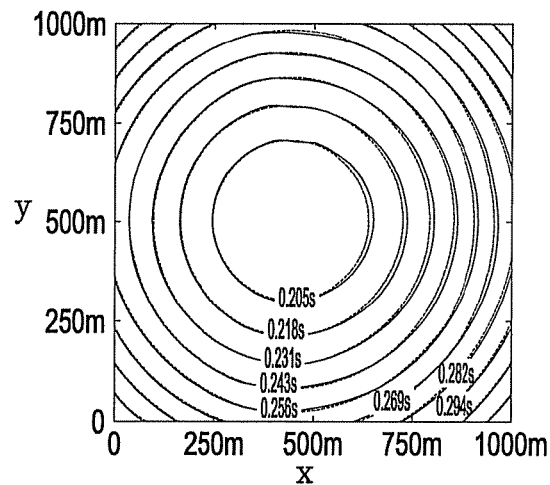
FIG. 7A and FIG. 7B, collectively referred to as FIG. 7, depict a horizontal slice (x-y) of the traveltime cube of FIG. 5, and a relative traveltime error (%) distribution between algorithm results and analytical results for the horizontal slice, respectively.
Figure 7B:
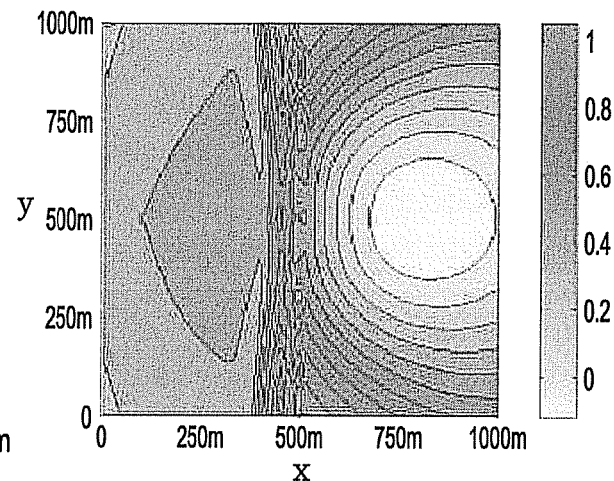

FIG. 7A shows a horizontal slice (x-y) of the traveltime cube of FIG. 5 at the depth 500 m, and FIG. 7B displays the relative traveltime error (%) distribution between the algorithm and the analytical results for the slice of FIG. 7A. The maximum relative error of less than 1% as shown in FIG. 7A evidences the degree of accuracy of the algorithm 400 for the TTI medium.

Figure 8A:
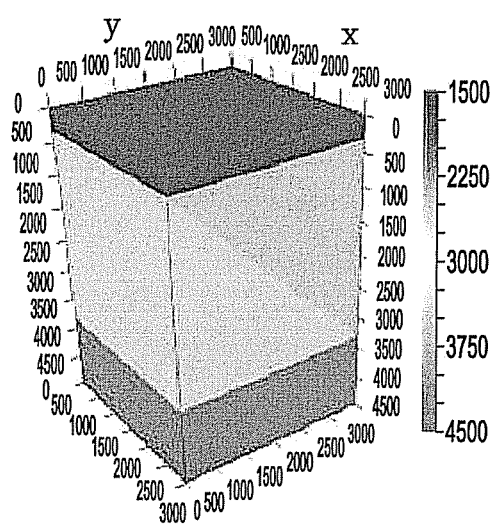
FIG. 8A and FIG. 8B, collectively referred to as FIG. 8, depict aspects of a four-layer 3D velocity model and a traveltime cube generated by a point source at (1500, 1500, 10), respectively.
Figure 8B:
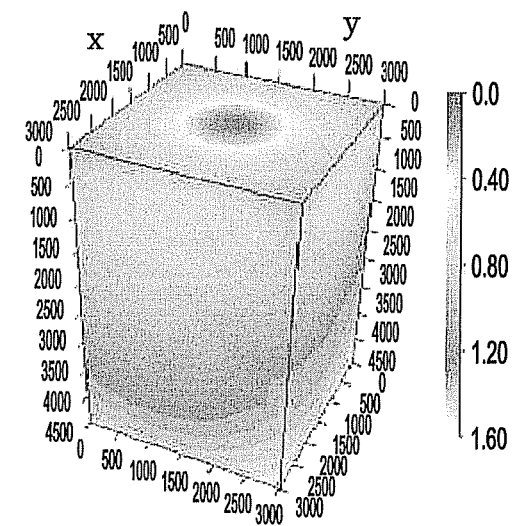

Another test was performed using different 3D TTI models. FIG. 8A depicts an example of a four-layer 3D velocity model. The second layer in the model dips 45° with TTI symmetry (symmetry axis 45° with respect to z and 0° with respect to x, where $\epsilon$=0.20, and $\delta$=0.1). The vertical P-wave velocities for the four layers were respectively 1500 m/s, 2500 m/s, 3500 m/s, and 4500 m/s. The grid points for the model were selected as 201×201×301 with 15 m grid spacing. FIG. 8B depicts the traveltime cube of the P wave generated from a point source at (1500 m, 1500 m, 10 m).

Figure 9A:
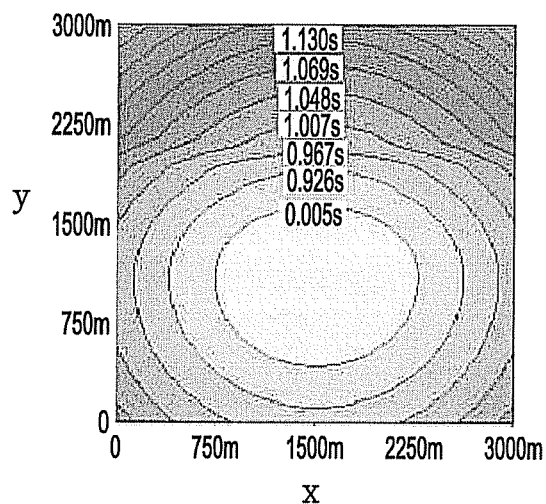
FIG. 9A and FIG. 9B, collectively referred to as FIG. 9, depict a horizontal (x-y) slice and a vertical (x-z) slice through the source point of the traveltime cube of FIG. 6B; and, FIG. 10A and FIG. 10B, collectively referred to as FIG. 10, depict a vertical (y-z) slice through the source point of the traveltime cube in FIG. 6B, and a comparsion with computation results from assumption of vertical symmetry axis (VTI), respectively.
Figure 9B:
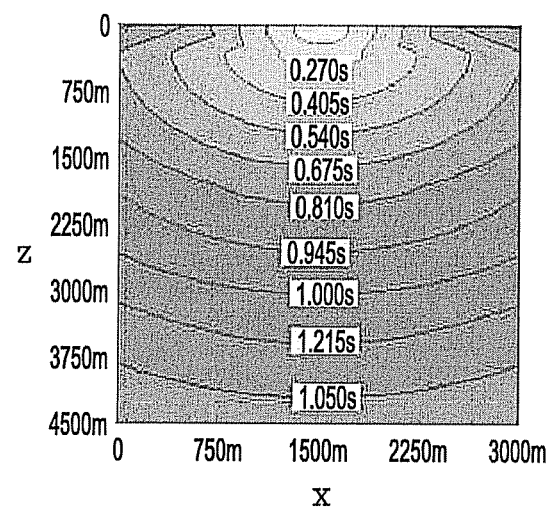

Referring to FIG. 9A, this figure shows a horizontal (x-y) slice at a depth of 2250 m. FIG. 9B displays a vertical (x-z) slice through the source point of the traveltime cube displayed in FIG. 8B. Examples provided in FIG. 8B, FIG. 9, and other TTI models are indicative of advantages that the algorithm 400 provides. These advantages include, among other things, efficiency, stability, and accuracy for calculating first arrival traveltimes for a 3D TTI model having large velocity gradients and arbitrary orientation of symmetry axis.

Figure 10A:
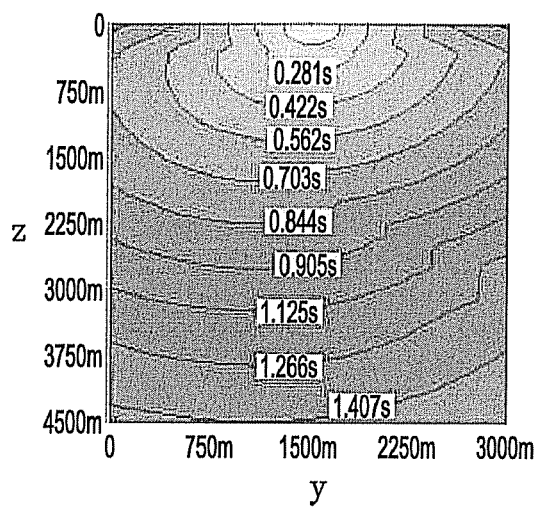
Figure 10B:
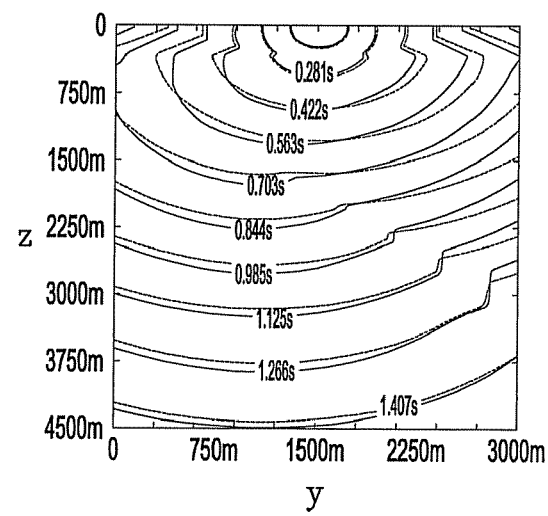

In addition, FIG. 10A shows another vertical (y-z) slice through the source point of the traveltime cube (FIG. 8B) with a comparison with the computation results using the assumption of strata having a vertical symmetry axis (VTI) (dashed lines) instead of a tilted symmetry axis (as depicted in FIG. 10B). The results show that if TTI medium is assumed to be VTI, for this model, the difference in traveltimes can be up to about 50 ms.

The numerical examples provided demonstrate that the algorithm 400 is efficient, stable, and accurate for calculating first arrival traveltimes in 3D TTI media. The examples also indicate that treating a TTI medium as VTI could result in traveltime errors, however, this is not conclusory. Advantageously, the algorithm 400 can be applied to a Kirchhoff pre-stack depth migration for 3D TTI media with comparatively little difficulty, as well as to estimation of TTI parameters for vertical seismic profile (VSP) data.

The algorithm 400 may be implemented as a method of the present invention and also may be implemented as a set computer executable of instructions on a computer readable medium, comprising ROM, RAM, CD ROM, Flash or any other computer readable medium, now known or unknown that when executed cause a computer to implement the method of the present invention.

While the foregoing disclosure is directed to the exemplary embodiments of the invention various modifications will be apparent to those skilled in the art. It is intended that all variations within the scope of the appended claims be embraced by the foregoing disclosure. Examples of the more important features of the invention have been summarized rather broadly in order that the detailed description thereof that follows may be better understood, and in order that the contributions to the art may be appreciated. There are, of course, additional features of the invention that will be described hereinafter and which will form the subject of the claims appended hereto.

What is claimed is:

1. A method for determining a slowness of a wave in three dimensional transversely isotropic (3D TI) media, the method comprising:

determining a vector for the wave;
calculating an angle between the wave vector and an axis of symmetry of the media; and,
using the calculated angle to determine the slowness of the wave for determining character of the surrounding media,
wherein a unit vector for a symmetry axis is defined as: (cos $\phi$ sin $\theta$, sin $\phi$ sin $\theta$, cos $\theta$);
where
$\phi$ represents the azimuth of the symmetry axis measured from the x direction; and,
$\theta$ represents the dip angle of the symmetry axis measured from the z direction.

2. The method as in claim 1, wherein calculating the angle $\alpha$ comprises solving the relationship:

$$\alpha = \cos^{-1}[(\tau_x \cos \phi \sin \theta + \tau_y \sin \phi \sin \theta + \tau_z \cos \theta)/(\tau_x^2 + \tau_y^2 + \tau_z^2)^{1/2}];$$

where
$\phi$ represents the azimuth of the symmetry axis measured from the x direction;
$\theta$ represents the dip angle of the symmetry axis measured from the z direction;
$\tau_x$ represents a traveltime derivative component for an x-axis;
$\tau_y$ represents the traveltime derivative component for a y-axis; and,
$\tau_z$ represents the traveltime derivative component for a z-axis.

3. The method as in claim 1, wherein determining the slowness $S_{ijk}$ comprises solving the relationships:

$$S_{ijk}(P) = 1/[v_{p0}(1 + \epsilon \sin^2 \alpha + D(\epsilon, \delta, \alpha, v_{p0}, v_{s0}))^{1/2}];$$

$$S_{ijk}(SV) = 1/\{v_{s0}[1 + (v_{s0}/v_{p0})^2 \epsilon \sin^2 \alpha - (v_{s0}/v_{p0})^2 D(\epsilon, \delta, \alpha, v_{p0}, v_{s0})]^{1/2}\}; \text{ and,}$$

$$S_{ijk}(SH) = 1/[v_{s0}(1 + 2\gamma \sin^2 \alpha)^{1/2}];$$

where
$v_{p0}$, $v_{s0}$ represent vertical velocities for P and SV waves, respectively;
$\alpha$ represents an angle between the wave vector and an axis of symmetry of the media; and,
$\epsilon$, $\delta$, $\gamma$ and D comprise relationships of components of stress and strain for the media.

4. The method as in claim 1, wherein determining the travel time comprises determining the travel time for a Kirchhoff pre-stack depth migration.

5. A computer program product comprising computer readable instructions stored on machine readable media, the instructions for determining slowness of a wave in three dimensional transversely isotropic (3D TI) media, by:

determining a vector for the wave;
calculating an angle between the wave vector and an axis of symmetry of the media; and,
using the calculated angle to determine the slowness of the wave,
wherein a unit vector for a symmetry axis is defined as: (cos $\phi$ sin $\theta$, sin $\phi$ sin $\theta$, cos $\theta$);
where
$\phi$ represents the azimuth of the symmetry axis measured from the x direction; and,
$\theta$ represents the dip angle of the symmetry axis measured from the z direction.

6. The computer program product as in claim 5, wherein calculating the angle $\alpha$ comprises solving the relationship:

$$\cos^{-1}[(\tau_x \cos \phi \sin \theta + \tau_y \sin \phi \sin \theta + \tau_z \cos \theta)/(\tau_x^2 + \tau_y^2 + \tau_z^2)^{1/2}];$$

where $\phi$ represents the azimuth of the symmetry axis measured from the x direction;

$\theta$ represents the dip angle of the symmetry axis measured from the z direction;

$\tau_x$ represents a traveltime derivative component for an x-axis;

$\tau_y$ represents the traveltime derivative component for a y-axis; and, $\tau_z$ represents the traveltime derivative component for a z-axis.

7. The computer program product as in claim 5, wherein determining the slowness $S_{ijk}$ comprises solving the relationships:

$$S_{ijk}(P) = 1/[v_{p0}(1+\epsilon \sin^2 \alpha + D(\epsilon, \delta, \alpha, v_{p0}, v_{so}))^{1/2}];$$

$$S_{ijk}(SV) = 1/\{v_{s0}[1+(v_{s0}/v_{p0})^2 \epsilon \sin^2 \alpha - (v_{s0}/v_{p0})^2 D(\epsilon, \delta, \alpha, v_{p0}, v_{s0})]^{1/2}\}; \text{ and,}$$

$$S_{ijk}(SH) = 1/[v_{s0}(1+2\gamma \sin^2 \alpha)^{1/2}];$$

where $v_{p0}$, $v_{so}$ represent vertical velocities for P and SV waves, respectively;

$\alpha$ represents an angle between the wave vector and an axis of symmetry of the media; and, $\epsilon$, $\delta$, $\gamma$ and D comprise relationships of components of stress and strain for the media.

8. The computer product as in claim 5, wherein determining the travel time comprises determining the travel time for a Kirchoff pre-stack depth migration.

9. A tool adapted for use within a wellbore comprising:

a transducer and a processor in communication with the transducer; and a computer program product for execution by the processor, the product comprising computer readable instructions for determining a slowness of a wave in media comprising features having at least one of a transverse isotropy (TI) and a tilted symmetric axis isotropy (TTI), by;

at least one of identifying and generating the wave;

determining a vector for the wave, wherein determining the vector comprises using a recursive loop from a previous slowness determination;

wherein a unit vector for a symmetry axis is defined as: $(\cos \phi \sin \theta, \sin \phi \sin \theta, \cos \theta)$; where $\phi$ represents the azimuth of the symmetry axis measured from the x direction; and, $\theta$ represents the dip angle of the symmetry axis measured from the z direction;

calculating an angle $\alpha$ between the wave vector and an axis of symmetry of the media, wherein calculating the angle $\alpha$ comprises solving the relationship: $\cos^{-1}[(\tau_x \cos \phi \sin \theta + \tau_y \sin \phi \sin \theta + \tau_z \cos \theta)/(\tau_x^2 + \tau_y^2 + \tau_z^2)^{1/2}]$; where $\phi$ represents the azimuth of the symmetry axis measured from the x direction; $\theta$ represents the dip angle of the symmetry axis measured from the z direction; $\tau_x$ represents a traveltime derivative component for an x-axis; $\tau_y$ represents the traveltime derivative component for an y-axis; and, $\tau_z$ represents the traveltime derivative component for an z-axis; and, using the calculated angle to determine a slowness of the wave; wherein determining the slowness $S_{ijk}$ comprises solving the relationships:

$$S_{ijk}(P) = 1/[v_{p0}(1+\epsilon \sin^2 \alpha + D(\epsilon, \delta, \alpha, v_{p0}, v_{so}))^{1/2}];$$
$$S_{ijk}(SV) = 1/\{v_{s0}[1+(v_{s0}/v_{p0})^2 \epsilon \sin^2 \alpha - (v_{s0}/v_{p0})^2 D(\epsilon, \delta, \alpha, v_{p0}, v_{s0})]^{1/2}\};$$

and, $$S_{ijk}(SH) = 1/[v_{s0}(1+2\gamma \sin^2 \alpha)^{1/2}];$$

where $v_{p0}$, $v_{so}$ represent vertical velocities for P and SV waves, respectively; $\alpha$ represents an angle between the wave vector and an axis of symmetry of the media; and, $\epsilon$, $\delta$, $\gamma$ and D comprise relationships of components of stress and strain for the media.

* * * * *